(12) United States Patent
Vegny et al.

(10) Patent No.: US 6,893,162 B2
(45) Date of Patent: May 17, 2005

(54) SYSTEM

(75) Inventors: Renaud Vegny, Oxon (GB);
Christophe P. Prel, Wallingford (GB)

(73) Assignee: Bookham Technology PLC, Abingdon (GB)

( * ) Notice: Subject to any disclaimer, the term of this patent is extended or adjusted under 35 U.S.C. 154(b) by 200 days.

(21) Appl. No.: 10/176,358

(22) Filed: Jun. 20, 2002

(65) Prior Publication Data

US 2003/0002801 A1 Jan. 2, 2003

(30) Foreign Application Priority Data

Jun. 22, 2001 (GB) .............................. 0115367

(51) Int. Cl.⁷ .............................................. G02B 6/38
(52) U.S. Cl. .............................. 385/59; 385/71; 385/77
(58) Field of Search ............................... 385/15–16, 39, 385/52–60, 62, 64–68, 70, 71, 76, 49, 88–89, 83

(56) References Cited

U.S. PATENT DOCUMENTS

| | | | |
|---|---|---|---|
| 5,199,093 A | | 3/1993 | Longhurst |
| 5,276,755 A | | 1/1994 | Longhurst |
| 5,441,397 A | * | 8/1995 | Eriksen et al. ............... 425/116 |
| 5,482,585 A | * | 1/1996 | Ota et al. .................... 156/158 |
| 5,519,799 A | * | 5/1996 | Murakami et al. ............ 385/78 |
| 5,555,332 A | * | 9/1996 | Dean et al. ................... 385/53 |
| 5,620,634 A | * | 4/1997 | Shahid ....................... 264/1.25 |
| 5,666,456 A | * | 9/1997 | Merriken .................... 385/134 |
| 5,689,599 A | * | 11/1997 | Shahid ........................ 385/83 |
| 5,703,973 A | * | 12/1997 | Mettler et al. ................ 385/14 |
| 5,706,378 A | * | 1/1998 | Suzuki et al. ................. 385/49 |
| 5,708,741 A | * | 1/1998 | DeVeau ........................ 385/49 |
| 5,712,939 A | | 1/1998 | Shahid |
| 5,780,079 A | * | 7/1998 | Lee ............................. 425/577 |
| 5,787,214 A | * | 7/1998 | Harpin et al. ................. 385/49 |
| 5,828,800 A | * | 10/1998 | Henry et al. .................. 385/20 |
| 5,849,204 A | * | 12/1998 | Matsumoto ................... 216/11 |
| 5,853,626 A | * | 12/1998 | Kato .......................... 264/1.25 |
| 5,859,945 A | * | 1/1999 | Kato et al. .................... 385/89 |
| 5,867,621 A | | 2/1999 | Luther et al. |
| 5,901,262 A | * | 5/1999 | Kobayashi et al. ........... 385/89 |
| 5,908,305 A | | 6/1999 | Crampton et al. |

(Continued)

FOREIGN PATENT DOCUMENTS

| | | |
|---|---|---|
| EP | 0 458 608 A | 12/1991 |
| EP | 0 532 470 A1 | 3/1993 |
| EP | 0 541 820 A1 | 5/1993 |
| EP | 1 048 964 A1 | 11/2000 |
| GB | 2 299 684 A | 10/1996 |
| WO | WO 01/04678 A1 | 1/2001 |

OTHER PUBLICATIONS

Combined Search and Examination Report for GB 0115367.5.

Fujikura Techincal Review 2000, Two Dimensional Array Optical Fiber Connector, 2000.

Siemens, The next generation of optical components for highi speed data transmission (Reprint from "Fiberoptic Product News"), Dec. 1998.

MTP™ Housing Components (internet publication retrieved on Nov. 22, 2000).

USCONEC™ MTP Multifiber Single–mode and Multimode Connectors and Adapter (internet publication retrieved on Nov. 22, 2000).

*Primary Examiner*—John R. Lee
*Assistant Examiner*—David A. Vanore
(74) *Attorney, Agent, or Firm*—Fulbright & Jaworski LLP

(57) ABSTRACT

A system (10) comprises a carrier (1) which is adapted to carry an optical fiber (9) and an optical chip (3) having a circuit element (4). The carrier and the optical chip are provided with co-operable alignment features (13,14) for aligning the carrier with the optical chip so that the optical fiber and the circuit element are optically coupled.

19 Claims, 2 Drawing Sheets

U.S. PATENT DOCUMENTS

| | | | | |
|---|---|---|---|---|
| 5,917,976 A | * | 6/1999 | Yamaguchi | 385/88 |
| 5,926,596 A | * | 7/1999 | Edwards et al. | 385/78 |
| 6,118,917 A | * | 9/2000 | Lee et al. | 385/49 |
| 6,129,865 A | * | 10/2000 | Jeong et al. | 264/1.25 |
| 6,160,936 A | * | 12/2000 | You et al. | 385/49 |
| 6,168,317 B1 | * | 1/2001 | Shahid | 385/71 |
| 6,250,819 B1 | * | 6/2001 | Porte et al. | 385/88 |
| 6,256,448 B1 | * | 7/2001 | Shahid | 385/147 |
| 6,259,856 B1 | * | 7/2001 | Shahid | 385/147 |
| 6,350,062 B2 | * | 2/2002 | Knecht et al. | 385/84 |
| 6,352,372 B1 | * | 3/2002 | Shahid | 385/59 |
| 6,474,877 B1 | * | 11/2002 | Shahid | 385/65 |

* cited by examiner

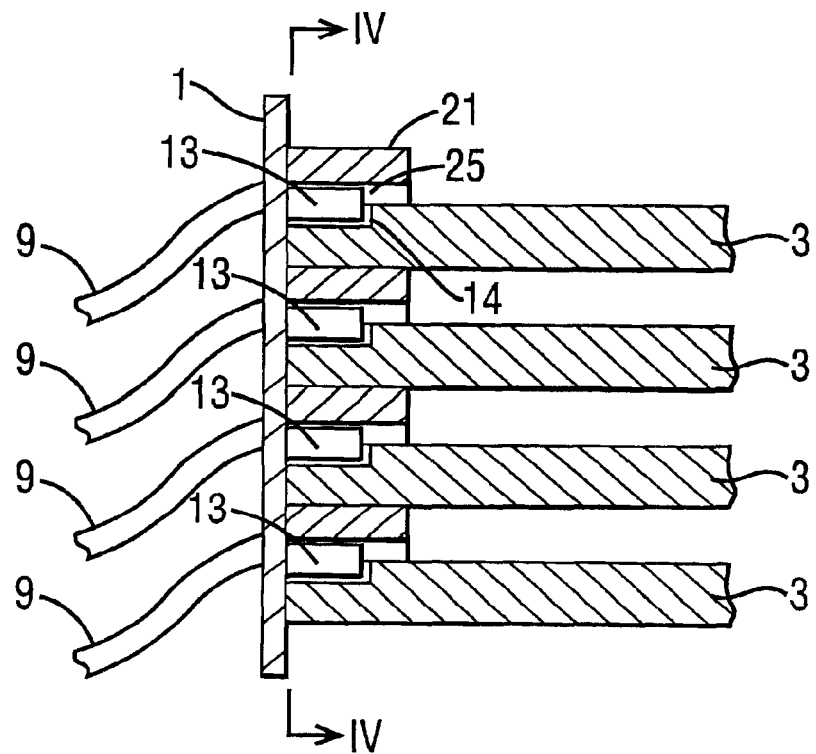
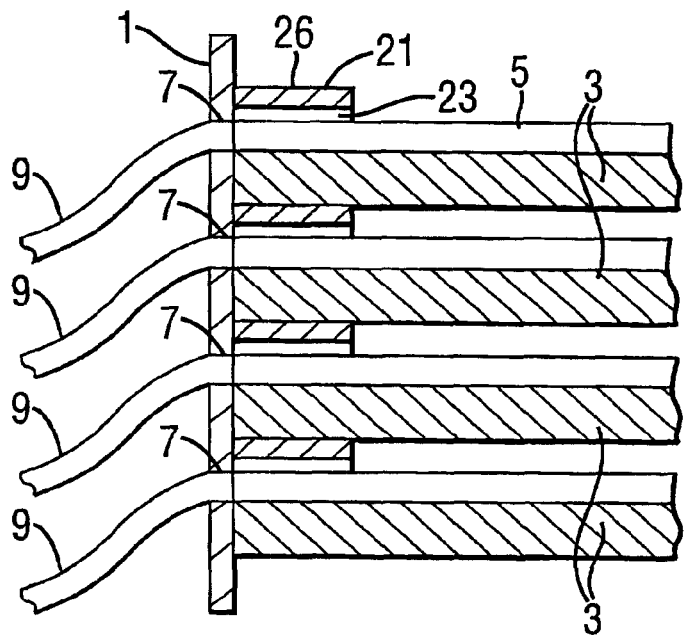
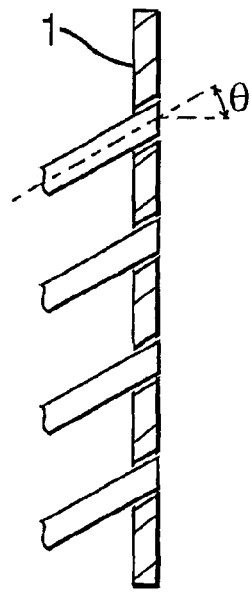

SYSTEM

FIELD OF THE INVENTION

The present invention relates to a system for optically coupling an optical fibre with a circuit element of an optical chip.

BACKGROUND OF THE INVENTION

It is known to couple an optical fibre to an optical chip through a mounting block. The optical fibre is secured in an open-ended passageway extending between proximal and distal faces of the mounting block so that the fibre end is flush with the distal face. The distal face is then adhered to a face of the optical chip so that the fibre end is positioned to optically couple with a circuit element of the optical chip, for example an optical waveguide, a multiplexer, a de-multiplexer, a photodiode or a laser diode, i.e. an element of an optical circuit provided on the optical chip which receives, transmits, carries or processes an optical signal. Accurate alignment of the fibre end with the optical circuit element is needed for optimal optical coupling, especially when an optical signal is to be transmitted between the optical fibre and a waveguide or vice-versa. It would therefore be useful to provide means for aligning the optical fibre end with the circuit element.

In EP-A-0458608 (BICC Plc) there is made known a system for optically coupling an optical fibre with an integrated optical chip in which the integrated optical chip is encapsulated in a moulded male connector part so that a face thereof having optical guides is flush with a face of the male connector part between a pair of guide pins. An optical fibre ribbon is encapsulated in a moulded female connector part with the ends of the individual optical fibres being flush with a face of the female connector part between a pair of guide holes. When the male and female connector parts are connected together by inserting the guide pins into the guide holes, the faces of the connector parts abut one another. Moreover, the positioning of the guide pins and holes is such as to result in passive alignment of the fibre ends with the optical guides for optical coupling therebetween.

It is also known to use complementary guide pins and guide holes to passively align the ends of optical fibres for fibre-to-fibre optical coupling. In this regard, mention may be made of U.S. Pat. No. 5,712,939 (Shahid/Lucent Technologies Inc.) and U.S. Pat. No. 5,867,621 (Luther et al/Siecor Corp.).

The aim of the present invention is to provide novel means for aligning an optical fibre with a circuit element of an optical chip.

SUMMARY OF THE INVENTION

According to the present invention there is provided a system comprising a carrier which is adapted to carry an optical fibre and an optical chip having a circuit element, the carrier and the optical chip being provided with co-operable alignment features for aligning the carrier with the optical chip so that the optical fibre and the circuit element are optically coupled.

The present invention therefore differs from the alignment solution made known in EP-A-0458608 supra in that the optical chip has an alignment feature with which the alignment feature on the carrier co-operates.

The present invention further provides a system comprising a plurality of optical chips each having a circuit element, and a carrier which is adapted to carry a plurality of optical fibres, one for each optical chip, the carrier and each optical chip having co-operable alignment features which, when the optical chips are arranged into a stack, co-operate to align the carrier so that the optical fibres are optically coupled with the circuit element of the respective optical chip in the stack.

Preferred features of the invention are set out in the dependent claims.

By way of example, exemplary embodiments of the present invention will now be described with reference to the accompanying Figures of drawings.

BRIEF DESCRIPTION OF THE FIGURES OF DRAWINGS

FIG. 2 is a cross-sectional side view of the system in its assembled state along section II—II in FIG. 1;

FIG. 3 is a cross-sectional side view of the system in its assembled state along section III—III in FIG. 1;

Figure 4:
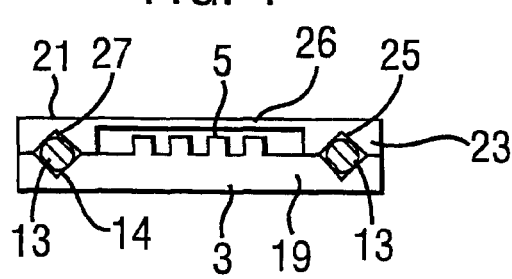
FIG. 4 is a cross-sectional view along section IV—IV in FIG. 2 showing the front of one of the optical chips in the stack.
Figure 5:
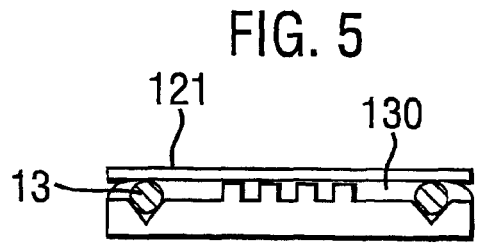

FIG. 5 corresponds to FIG. 4 showing an alternative construction of lid; and

FIG. 6 is a cross-sectional side view of the carrier showing the orientation of holes provided in the carrier for the optical fibres.

DETAILED DESCRIPTION OF THE EXEMPLARY EMBODIMENTS OF THE INVENTION

Figure 1:
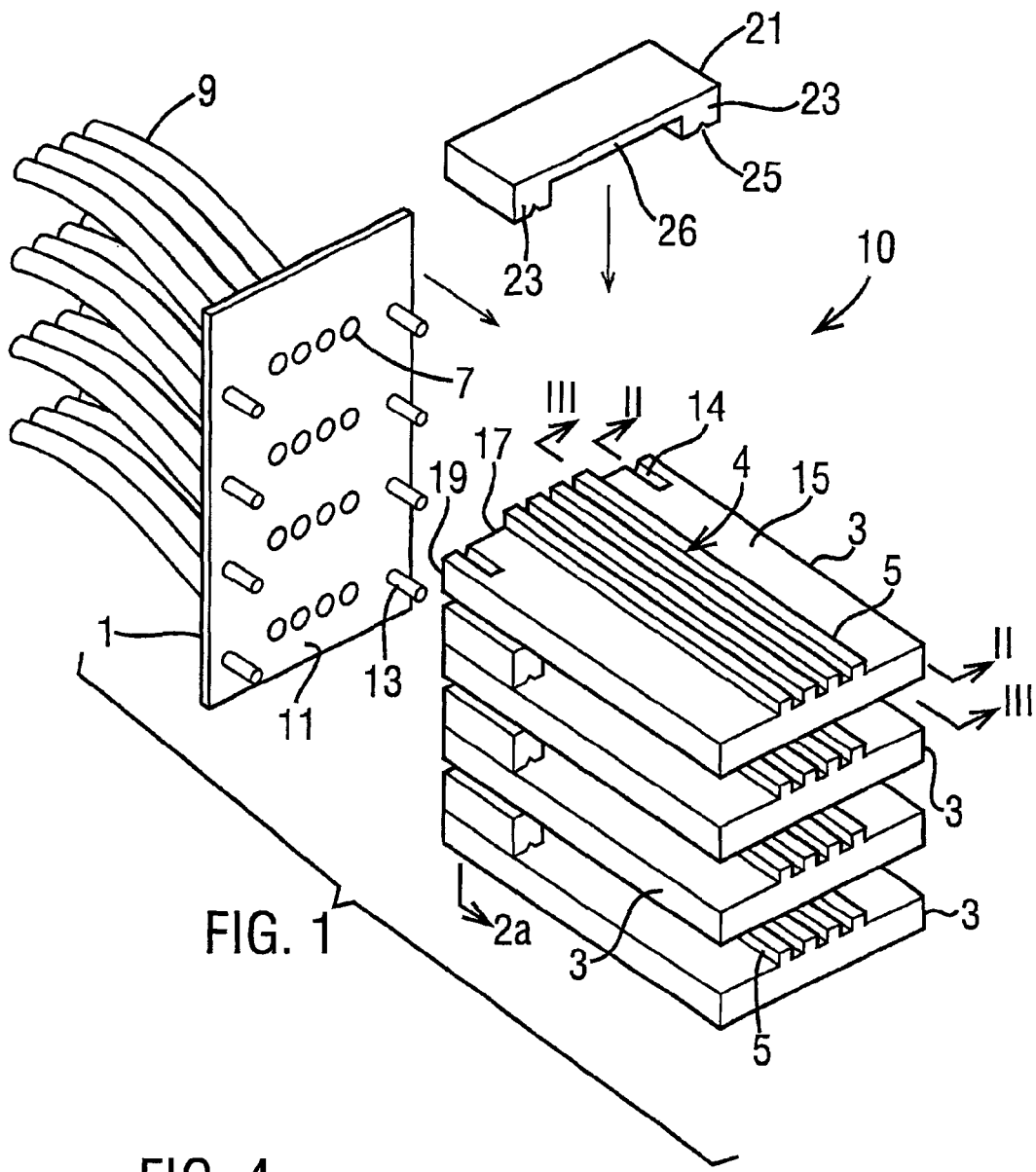
FIG. 1 is a perspective, exploded view of a system of the invention comprising a carrier which carries several rows of optical fibres, a stack of optical chips and a series of lids for spacing the optical chips in the stack.

In FIG. 1 there is shown a system 10 of the invention comprising a silicon carrier 1 and a plurality of integrated silicon optical chips 3 arranged into a stack, each optical chip 3 having an array 4 of monolithic waveguides 5 as is known in the art (see e.g. WO95/08787). As an example, the silicon carrier 1 can be formed from a silicon wafer having a thickness of about 500 $\mu$m.

As shown in FIGS. 1 and 3, a plurality of rows of holes 7 are etched in the carrier 1 so as to extend therethrough. Each hole 7 is used to mount an optical fibre 9 to the carrier 1. The diameter of the holes 7 is matched to that of the optical fibres 9 for a close fit and the optical fibres 9 are secured in the holes 7 with epoxy resin adhesive so that the ends thereof are substantially co-planar with a coupling face 11 of the carrier 1. As an example, the diameter of the holes 7 may be about 125 $\mu$m.

The optical fibres 9 may form part of an optical fibre ribbon or individual optical fibre cables. In either case, a distal part of the outer protective layer of the ribbon or each cable is stripped-off to reveal the optical fibres.

As well as the holes 7 for the optical fibres 9, additional holes (not shown) are etched in the carrier 1, the purpose of which will become clear shortly.

After the optical fibres 9 are secured in the holes 7, the coupling face 11 of the carrier 1 and the substantially co-planar ends of the optical fibres 9 are polished. After polishing, guide pins 13 are inserted into the additional holes etched in the carrier I and secured in place with epoxy resin adhesive. As shown in FIG. 1, the guide pins 13 are arranged into pairs on opposing sides of the fibre holes 7, i.e. into a series of rows.

Turning now to the construction of the optical chips 3, on either side of the waveguide array 4 there is etched a V-shaped groove 14 to extend along an upper face 15 of the chip from an edge 17 with a coupling face 19, as is known in the art. The depth of the V-shaped grooves 14 may be such that the tapered flanks are co-terminus, i.e. form an apex. Alternatively, the etch may be curtailed to provide a flat bottom to the grooves 14. In any event, the spacing between the V-shaped grooves 14 on each optical chip 3 matches the spacing of the guide pins 13 whereby the guide pins 13 can be slotted into the V-shaped grooves 14.

As will be understood from FIGS. 1 to 3, the optical chips 3 are stacked one upon the other with a series of lids 21 being used as spacers. The lids 21 are preferably made from Pyrex, silica or silicon. As shown in FIG. 4, each lid 21 has outer legs 23 in which are etched V-shaped grooves 25 which correspond to the V-shaped grooves 14 in the optical chips 3. The outer legs 23 of each lid 21 are connected by a bridge element 26, the height of which is greater than the height of the waveguides 5. Thus, when the lids 21 are secured to the associated optical chip 3, a channel 27 is formed by the opposed pairs of V-shaped grooves 14, 25 and the bridge element 26 bridges the waveguide array 4.

The mutual spacing of the guide pins 13 on the carrier 1 is such that, once the optical chips 3 have been stacked, the guide pins 13 are able to be inserted into the channels 27 formed between the optical chips 3 and the lids 21 and secured in place by, for example, epoxy resin adhesive. Ideally, the relative dimensioning of the guide pins 13 and the V-shaped grooves 14, 25 is such as to provide a 4-point contact on the guide pins 13, as shown in FIG. 4.

The arrangement of the fibre holes 7 relative to the guide pins 13 is such that inserting the guide pins 13 into the channels 27 results in the fibre ends at the coupling face 11 of the carrier 1 being accurately aligned with, and juxtaposed to, the waveguides 5 for optical coupling therebetween. Accordingly, the guide pins 13 and the channels 27 provide for passive alignment of the fibre ends with the waveguides 5 thereby ensuring efficient optical coupling therebetween.

Although the foregoing embodiment is for optically coupling a series of rows of optical fibres with a stack of optical chips, it will be understood that it is within the scope of the present invention for the carrier to be modified to optically couple a single row of optical fibres with a single optical chip, or to optically couple a column of single optical fibres to a stack of optical chips or to optically couple a single optical fibre to a single optical chip.

Referring now to FIG. 5, there is shown an alternative lid 121 for use in place of the lid 21 shown in FIGS. 1 to 4. In this embodiment, the lid 121 is of a simple plate-like form and is secured to the upper face 15 of one of the optical chips 3 through epoxy resin adhesive 130 or some other suitable adhesive. In this case, the lid 121 would be applied to the optical chip 3 after the guide pins 13 of the carrier 1 have been located in the V-shaped grooves 14 of the chip 3. The alternative lid 121 would be more suited to the case where the carrier 1 is modified to work with a single optical chip 3 instead of a stack of optical chips 3.

In a preferred embodiment of the invention, the holes 7 for the optical fibres 9 are etched in the carrier 1 so that the hole axes are at an inclined angle to the plane of the coupling face 11 of the carrier 1. This is shown in FIG. 6. In this manner, the axes of the optical fibres 9 will be inclined to the axes of the waveguides 5. This improves the optical coupling between the optical fibres 9 and the waveguides 5 by reducing the amount of optical signal loss, as detailed in U.S. Pat. No. 5,787,214 (Harpin et al/Bookham Technology Ltd.). The preferred angle θ formed between the axes of the holes 7 and a normal to the coupling face 11, and hence the respective axes of the optical fibres 9 and waveguides 5, is 6–7°.

In the preferred embodiment shown in FIG. 6, the optical fibres 9 are cleaved before being mounted in the holes 7 of the carrier 1. The cleavage is such as to give each optical fibre 9 an end face which is inclined to the longitudinal axis of the optical fibre 9 so that the end face is generally co-planar with the coupling face 11 when the optical fibre 9 is mounted in its hole 7 of the carrier 1.

Although not shown, the coupling face 19 of the optical chips 3 may be inclined to the upper face 15. As an example, the coupling face 19 may form an interior angle of 94–98° with the upper face 15, preferably substantially 95°. Expressed another way, the coupling face 19 may be inclined at an angle of 4–8°, preferably substantially 5°, to a normal to the upper face 15. The ends of the waveguides 5 at the coupling face 19 may be similarly angled so as to be coplanar with the coupling face 19.

The system 10 described above with reference to the accompanying Figures of drawings could, of course, be supplemented by a further carrier which is connected to the opposite ends of the optical chips 3 in the same fashion to optically couple optical fibres to the opposite ends of the waveguides 5.

It will be understood that the present invention is not restricted to the embodiments described but may be varied and modified in many different ways within the scope of the appended claims.

What is claimed is:

1. A system having a carrier which is adapted to carry an optical fibre and an optical chip having a circuit element characterized in that the carrier and the optical chip are provided with co-operable alignment features for aligning the carrier with the optical chip so that the optical fibre and the circuit element are optically coupled, wherein the carrier has a face which faces towards the optical chip when the alignment features are aligned, wherein the carrier has an open-ended passageway into which the optical fibre is insertable, one of the open ends of the passageway being in the face of the carrier, wherein the passageway meets the face of the carrier at an inclined angle thereto.

2. A system according to claim 1, wherein the alignment features are adapted to engage with one another.

3. A system according to claim 1, wherein the alignment features are complementary structural features of the carrier and the optical chip.

4. A system according to claim 3, wherein the complementary structural features are male and female features.

5. A system according to claim 4, wherein the male feature has a pair of guide pins on the carrier and the female feature has a guide channel for each guide pin in the optical chip.

6. A system according to claim 5, wherein the guide channels are grooves formed in a surface of the optical chip.

7. A system according to claim 4 further having a retainer for retaining the male feature in the female feature.

8. A system according to claim 5 further having a retainer in the form of a bar which is adapted in use to bear on the guide pins in the guide channels for retaining the guide pins in the guide channels.

9. A system according to claim 8, wherein the bar has a surface which has a pair of grooves which are adapted in use to register with the guide channels to form an enclosure about each guide pin.

10. A system according to claim 9, wherein the guide and bar channels have a tapered profile so that, in use, each enclosure provides a 4-point contact on the associated guide pin.

11. A system according to claim 1, wherein the carrier is adapted to carry a plurality of optical fibres.

12. A system according to claim 1, wherein the passageway is the first of a plurality of corresponding passageways, and wherein the carrier is adapted to carry a plurality of optical fibres, one in each passageway.

13. A system according to claim 12, wherein the open ends of the passageways in the face of the carrier are arranged a row.

14. A system having a carrier which is adapted to carry an optical fibre and an optical chip having a circuit element characterized in that the carrier and the optical chip are provided with co-operable alignment features for aligning the carrier with the optical chip so that the optical fibre and the circuit element are optically coupled, further having one or more further optical chips having a circuit element, wherein the carrier is adapted to carry an optical fibre for each optical chip and wherein the carrier and each optical chip have co-operable alignment features for aligning the carrier so that when the optical chips are arranged into a stack the optical fibres are coupled with the circuit element of the respective optical chip in the stack, said system further having a retainer in the form of a bar which is adapted in use to bear on the guide pins in the guide channels for retaining the guide pins in the guide channels further having a further bar for each further optical chip, the bars adapted in use to space the optical chips in the stack.

15. A system having a carrier which is adapted to carry an optical fibre and an optical chip having a circuit element characterized in that the carrier and the optical chip are provided with co-operable alignment features for aligning the carrier with the optical chip so that the optical fibre and the circuit element are optically coupled, further having one or more further optical chips having a circuit element, wherein the carrier is adapted to carry an optical fibre for each optical chip and wherein the carrier and each optical chip have co-operable alignment features for aligning the carrier so that when the optical chips are arranged into a stack the optical fibres are coupled with the circuit element of the respective optical chip in the stack, wherein the carrier has a face which faces towards the optical chip when the alignment features are aligned, wherein the carrier has an open-ended passageway into which the optical fibre is insertable, one of the open ends of the passageway being in the face of the carrier, wherein the passageway is the first of a plurality of corresponding passageways, and wherein the carrier is adapted to carry a plurality of optical fibres, one in each, wherein the open ends of the passageways in the face of the carrier are arranged into a column for optically coupling the circuit element of each optical chip in the stack with one of the optical fibres received in the passageways when the alignment features are aligned.

16. A system having a carrier which is adapted to carry an optical fibre and an optical chip having a circuit element characterized in that the carrier and the optical chip are provided with co-operable alignment features for aligning the carrier with the optical chip so that the optical fibre and the circuit element are optically coupled, further having one or more further optical chips having a circuit element, wherein the carrier is adapted to carry an optical fibre for each optical chip and wherein the carrier and each optical chip have co-operable alignment features for aligning the carrier so that when the optical chips are arranged into a stack the optical fibres are coupled with the circuit element of the respective optical chip in the stack, wherein the carrier has a face which faces towards the optical chip when the alignment features are aligned, wherein the carrier has an open-ended passageway into which the optical fibre is insertable, one of the open ends of the passageway being in the face of the carrier, wherein the passageway is the first of a plurality of corresponding passageways, and wherein the carrier is adapted to carry a plurality of optical fibres, one in each passageway, wherein the open ends of the passageways in the face of the carrier are arranged into a row of columns for optically coupling the circuit element of each optical chip in the stack with one of the rows of the optical fibres received in the passageways when the alignment features are aligned.

17. A system according to claim 1, wherein the circuit element is at least one optical waveguide.

18. A system having a carrier which is adapted to carry an optical fibre and an optical chip having a circuit element characterized in that the carrier and the optical chip are provided with co-operable alignment features for aligning the carrier with the optical chip so that the optical fibre and the circuit element are optically coupled, wherein the carrier has a face which faces towards the optical chip when the alignment features are aligned, wherein the carrier has an open-ended passageway into which the optical fibre is insertable, one of the open ends of the passageway being in the face of the carrier, wherein the circuit element is an optical waveguide having an axis and the passageway in the carrier has an axis which, when the alignment features are aligned, is at an inclined angle to the axis of the optical waveguide.

19. A system according to claim 1 in an assembled state with the carrier carrying the optical fibre.

* * * * *